2,959,631

INDIUM-CONTAINING ALLOYS AND ELECTRICAL ENERGY PRODUCING CELLS INCLUDING THE SAME

Thomas L. Boswell, Elgin, Ill., assignor to Elgin National Watch Company, Elgin, Ill., a corporation of Illinois No Drawing. Filed July 1, 1954, Ser. No. 440,867

6 Claims. (Cl. 136—83)

In my copending application, Serial No. 302,183, filed August 1, 1952, now U.S. Patent 2,683,184, there is described and claimed the employment of indium as an anode for electrical energy producing cells.

The present invention relates to the preparation of alloys of indium with bismuth and possibly including other elements; and distinguished, when employed as anodic material in electrical energy producing cells, by exhibiting a lesser tendency to polarize as an anode than indium itself, and by recovering more quickly from the polarized condition; and being further characterized in having higher tensile and bending strengths and greater resistance to cold flow than commercially or chemically pure indium.

It has been found that there is a unique interaction between indium and bismuth, by which a battery anode of indium-bismuth alloy appears to behave as though made of pure indium by exhibiting the same open circuit voltage and while operating at low current densities per unit area; but exhibiting a far greater reluctance to polarize, for example by exhibiting relatively higher voltages at successively higher current densities, and, if polarized for example by short circuiting, being strikingly more rapid in recovering from the polarized state. In this respect, bimuth is strikingly different from lead, tin, cadmium, zinc, copper, silver, lithium and other elements when employed for alloying indium to produce greater tensile and bending strengths. Furthermore, the behavior of bismuth in indium alloys is unique in that only small relative quantities are necessary for producing striking effects; for example, 2 percent of bismuth has been found effective in controlling the polarization effect in binary indium alloys. Indeed, the effect of bismuth can be found when present in amounts as small as 0.05 percent or below. Furthermore, the presence of bismuth, in ternary alloys with indium and such elements as lead, antimony, tin, cadmium, copper, silver, lithium, etc., has the unique property of inhibiting gassing under conditions where this would otherwise occur, as for example, in the indium-lithium alloys.

A feature of this invention is the provision of an electrical energy producing cell having an anodic material containing indium and bismuth.

Another feature is the provision of an electrical energy producing cell having an anodic material demonstrating high resistance to polarization upon heavy current drain per unit area and quick recovery from polarization; and effective for delivery of current at higher ratio per unit area than indium itself.

A further feature is the provision of an anode for an electrical energy producing cell which has the open circuit voltage characteristics of indium; but which further exhibits a greater reluctance to become polarized, and which has higher mechanical properties than indium.

Another feature is the provision of an anodic material having the electrochemical behavior of indium at open circuit conditions; and characterized in exhibiting a regularity or uniformity of behavior both when first assembled in a cell and during the course of cell life, even with repeated heavy current drains or short circuits, as compared with an indium anode.

Another feature is the provision of alloys containing indium and bismuth, which have mechanical properties superior to indium and electrochemical properties, in contact with alkaline electrolytes, of compatibility with indium.

With these and other features as objects in view, as will appear in the course of the present description and claims, illustrative examples of employment of the invention will be set out.

In my aforesaid patent application, the behavior of indium in an electrical energy producing cell has been described. Indium is a soft metal, having very low mechanical properties, such as proportional limit, ultimate tensile strength, bending strength, compression strength, shear strength, and hardness. Accordingly, when large and weighty anode masses are required, for the ampere-hour delivery specification of a cell which may receive severe shocks in service, parts of the indium anode body itself, or of a small indium supporting or terminal member, may be distorted by momentum or inertia conditions, so that the cell may become defective by break of the seal at the anode or connection, or even by break of electrical continuity of conductive parts. In electrochemical systems, alien metals cannot be employed for such connections or supports unless there is compatibility; i.e., unless the potentials from the indium and the other metal, relative to the electrolyte, are identical: lacking this, local cell action occurs, with quick corrosion and exhaustion of either the indium anodic mass or of the connecting part, so that in the former case shelf life is low and the calculated ampere-hours are not attained; and in the latter case the connection is corroded and destroyed, so that the anode is no longer in circuit.

Another factor in the operation of such cells with indium anodes is that minute quantities of impurities in the commercially available indium metal appear sometimes to render the cell sluggish in passing from the condition as first assembled, or from the condition after a period of storage, to the condition of readiness for full operational delivery. While this behavior can be prevented by the cleaning described in my patent application, or by subjecting the cell to preliminary "working" for some minutes prior to use, such operations represent a loss from the calculated ampere-hour delivery from the weight of indium employed, and—more particularly for employments where space is constricted as in batteries for electrically driven watches and like instruments, or where low weight is important, as in some meterological work—the loss of indium is uneconomic and the loss of indium mass within the cell represents idle space and useless weight during the service of the battery.

When it is sought to increase the mechanical strength of the indium by introducing another element as an alloying or admixing substance, it is found that local corrosion effects occur in some instances when the anode is merely dipped into the intended electrolyte; in other cases, the composite exhibits gassing by reactions when present as an anode body in an electrical cell, even without current draft; in yet other instances, the mass becomes crumbly and brittle after exposure to moisture; and, above all, most such alloys polarize rapidly under load, that is while an indium-anode cell of a given size may work satisfactorily at a standard current delivery; a like cell having an anode of the composite has a badly dropping potential characteristic from open circuit voltage as the load resistance is lowered, and may go to zero at the standard current delivery. That is, such materials require major redesign of the mass, area, and chemical factors for each employment; and, due to shelf-corrosion and gassing, frequently cannot be employed in sealed batteries which are to be stored in assembled and ready condition prior to use, or which are to deliver current regularly over long periods of effective life.

*Example I*

An alloy of 95 percent by weight of indium and 5 percent of bismuth was made by melting the elements together, stirring and pouring to form a bar having a section about one-fourth inch square. This bar was mechanically and chemically cleaned, and then compressed in an extrusion device through a nozzle 0.070 inch diameter to form a wire. Tests of compressional strength of standard sized pieces of the alloy, and of the bending behavior of standard lengths of the wire in a Tinius-Olsen stiffness tester, indicated that the resistance to flow of the alloy under compression loads of 300 p.s.i. was about three times greater than that of indium; and the initial stiffness under bending loads was about four times as great; while after being held in bent condition for 5 and 10 minutes, the alloy exhibited stiffnesses still more than three times that of indium.

A striking characteristic of such cells having the InBi alloy anodes is the regularity of behavior as compared to those with indium anodes. The open-circuit voltages (OCV) of like cells having an electrolyte of 35–40 percent potassium hydroxide solution and mercuric oxide cathodic masses, were the same with indium and with alloy anodes. With all alloy anode cells and most of the indium anode cells, the behaviors while working across loads of 250 and 25 ohms were essentially the same; and each cell recovered OCV quickly after short-circuiting. However, some indium anode cells were not regular in behavior immediately after assembly, or after an idle storage period, or in recovery from short-circuit polarization state. For example, when comparing short-circuit recoveries with a different cell having an elemental indium anode, the cell having the alloy anode exhibited full OCV immediately, whereas several minutes running of the cell with the indium anode was necessary before it developed the same OCV. In another comparison, a freshly made indium anode cell was connected for heavy current drain, and was found to polarize at 250 ohms: the alloy anode cell under identical conditions did not polarize but delivered even heavier currents from the freshly made condition. Thus there was regularity of performance with a large number of cells with alloy anodes, whereas some cells with indium anodes were irregular in starting, or in recovery after short-circuit.

This regularity was likewise present in the InBi 98:2 alloy.

*Example II*

An alloy was made of 90 parts by weight of indium, 5 parts of bismuth, and 5 parts of antimony; and prepared and tested mechanically as in Example I. A comparison alloy was made of 95 parts of indium and 5 parts of antimony. The comparable hardness values were (indium) 0.96 BHN, (InBi 95:5) 3.6, (InBiSb 90:5:5) 3.8, (InSb 95:5) 2.2. The resistance to flow under compression at 300 p.s.i. of the above bismuth-containing ternary alloy was about six times that of indium; but only half that of the comparison indium:antimony binary alloy (95:5).

Upon the electrical cell tests as in Example I, the differences were even more striking. Cells with anodes of InSb alloy (95:5) had an OCV of about 1.15, like those with indium anodes. The InSb anode cells became polarized at lower current rates than most of the In anode cells: and, even more characteristically, the InSb anode cells were extremely sluggish in returning to OCV after the load was removed.

In many cases of cells with InSb 95:5 alloy anodes, the cells at first worked well at certain intermittent loads; but when the tests were continued over times of months, the OCV between load applications would gradually drop and ultimately the cells exhibited strong polarization effects: after such polarization, it was sometimes necessary to clean away the polarized film electrochemically before the cells would return to initial OCV. By comparison, cells with InBiSb (90:5:5) alloy anodes have the same OCV, and were more regular than cells with In anodes in resistance to polarization, and would carry heavier currents than the cells with In anodes, being comparable to cells with the InBi 95:5 alloy anodes and quickly recovered from polarization after short-circuiting.

A like alloy of InBiSb in the weight ratio of 95:2½:2½ behaves similarly to the 90:5:5 alloy in electrical characteristics; mechanically it was less resistant to cold flow than the 90:5:5 alloy but acceptably superior to indium, noting that it has a greater amount of indium per weight and volume unit, and is comparable to the InBi 95:5 alloy above.

*Example III*

Similarly, an InBiPb alloy of the ratio 92:2:6 by weights formed mechanically stiff anodes, which exhibited no tendency to polarize; whereas binary InPb (2–4–8–16 percent Pb) alloys were highly susceptible to polarization.

*Example IV*

Alloys containing 94 weight percent of indium with 2 percent of bismuth and 4 percent of silver, copper, cadmium, or tin have likewise been found of superior mechanical properties to indium; and essentially free from polarization at satisfactory load or current density values, whereas the corresponding binaries without bismuth exhibited polarization effects at far lower current densities.

*Example V*

A InZn 95:5 alloy had strong tendency to polarize as anode, whereas InBiZn 90:5:5 alloy anodes did not and were comparable to the 95:5 InBi alloy anodes in electrochemical behavior. The 95:5 InZn alloy exhibited heavy gassing when covered with electrolyte.

The InHg 95:5 alloy was likewise highly polarizing, and gassed heavily. The ternary InHgBi 90:5:5 alloy was comparable to the 95:5 InBi alloy in electrochemical behavior.

In some cell constructions, it is desirable to have a massive anode, and to support and electrically connect it by a separate member such as a pin or rivet. If the pin or rivet is to be exposed to the electrolyte at any time during cell life, it should not exhibit a significant voltage difference from the anode body, or local cell action will occur as set out above; that is, the material of such pin or rivet should be electrochemically or galvanically compatible with the anode material. A noted characteristic of various InBi alloys described herein is that they exhibit the potential of indium, and hence are compatible with indium and with one another. Since small volumes and weights are present for such pins or rivets, compared to the anode mass, the amount of bismuth and/or the third element may be increased without significant reduction of the energy/volume ratio of the cell; and it has been found that the amounts of elements added to the indium may be made very high without disturbing the galvanic compatibility with or equivalence to pure indium. Further, in some instances a small exposed area of an InBi alloy pin connected to an indium anode acts to reduce the voltage drops under load which would otherwise be exhibited by the indium anode: the uniqueness of bismuth is illustrated by the contrary effect of an InPb pin in causing greater voltage drops.

*Example VI*

An alloy of 60 weight parts of lead, 40 weight parts of indium, as a basic mixture, was melted with 5 parts of bismuth; cast and extruded; pins formed therefrom were mechanically and electrically connected to anode masses of indium and of InBi 95:5 alloy. Upon employment in the above 35–40 percent potassium hydroxide electrolyte and a mercuric oxide cathode, extended runs at various loads showed no tendency toward polarization up to loads endured by the anodic mass itself, and no evidence of selective corrosion by local cell action. The alloy was surprisingly strong. By comparison, in a test with a pin of 60:40 PbIn alloy and an In anode, polarization occurred at low current densities.

*Example VII*

The alloy of Example I above (InBi 95:5) was made into pins, and likewise employed as in Example VI, with similar results. These pins, however, were not so mechanically strong as those of Example VI.

*Example VIII*

An alloy of 50 weight parts of indium, 50 weight parts of antimony and 5 parts of bismuth is strong and has the desired electrochemical characteristics, under like conditions.

*Example IX*

A pin from an alloy of 97.75 weight parts of indium, 2 weight parts of bismuth and 0.25 weight part of lithium is strong and of good electrochemical behavior, under like conditions.

In general, when the binary InBi alloy is being employed as supporting-connecting pin, or unitary pin and anode, it is preferred to have the bismuth content at about 5 to 8 percent, for the reason that lesser strength values are obtained at lower or higher ratios, noting that apparently little improvement occurs between 5 and 8 percent and that the volume occupied by bismuth at the upper ratio will subtract 3 percent from the amount of indium available for anodic use. Repeating strength and stiffness tests upon the alloy masses or wire, after some weeks, frequently show increases of such values, possibly due to age-hardening. Two percent of bismuth confers desirable electrochemical properties, and hence when the strength properties for pins can be attained otherwise, such quantity of bismuth is presently preferred. For example, the ternary alloys of Example IV have the third element primarily for strength, and the bismuth is present to correct bad electrochemical characteristics and to add some strength. It may be noted, however, that the electrochemical characteristics of bismuth have been found present up to at least 32 percent, without changing the essential anodic characteristic of indium.

A cell having an anode of InBi alloy (99:1), without prior conditioning, was subjected to a run of 120 minutes, with reduction of load resistance every ten minutes, so that the current flow increased from 0.68 to 1.10 milliamperes in 50 minutes, and successively to 1.25, 1.50, 4.10, 8.0, 15.0, 23.5 and ultimately 35.0 milliamperes at 120 minutes, representing current densities of 6.15 to 316.0 milliamperes per square inch. Therewith the voltage dropped at such current flows from 1.06 to 0.88 (OCV about 1.15). Under these conditions, the energy output was finally about 278 milliwatts per square inch without polarization. A comparison cell, with indium anode, was given a first run without prior conditioning. The load resistance was likewise reduced, wherewith the current density rose regularly from 5.78 to 10.4 milliamperes per square inch, with concurrent voltage change from 1.11 volts to 0.19 volt. By comparison, the alloy anode cell carried over 72 milliamperes per square inch at 1.00 volt; whereas the indium anode cell carried less than 7 milliamperes per square inch at 1.00 volt; the alloy anode cell carried up to 316 milliamperes per square inch at a voltage of 0.88 before failing by polarization; whereas the indium anode dropped to below 0.19 volt at a load of only 10.4 milliamperes per square inch. After preliminary conditioning of another cell with an indium anode, the voltage drop under increasing current drains was more comparable to that of the cell with the above InBi 99:1 alloy.

Lithium alloys with indium show high increments of strength with small weight percentages of lithium; but when 1 percent of lithium is present, the alloy corrodes in air of usual moisture content. Also, when a specimen is immersed in the electrolyte, gassing is noted. When bismuth is included, this gassing effect is reduced or eliminated.

Cells with anodes of the binary InLi alloy were highly susceptible to polarization even at light loads, whereas cells with anodes of the ternaries containing 2 percent or over of bismuth were free of this up to loads beyond those endured by pure indium.

Even amounts as low as 0.01 percent of lithium may exhibit strengthening or stiffening effects particularly with Bi present; the effect at 1 percent lithium was less than at 0.5 percent in some tests; and no general advantage appears at over 0.5 percent.

The alloys need not be employed solely as such. The introduction of materials which take no necessary part in the electrochemical system of the battery provides a means of increasing the resistance to cold flow, in cases where volume considerations permit such materials to be present. In preferred practice, chemically inert and insoluble oxides such as aluminum oxide, chromium oxide, and silicon oxide have been employed in finely divided form; by stirring into the molten alloy or by ballmilling. Apparently the greatest effect per quantity of the inert oxide is attained by very fine division, e.g., by use of the so-called "superfine" forms having particle sizes around 0.04 micron and agglomerate sizes of 6 microns. It has been found that 10 parts by weight of aluminum oxide powder (socalled 300 mesh) with 90 parts of an above alloy is effective to raise the hardness of the composition from a value of say 2.0 to 4.2 BHN for the given alloy to a value of 3.0 to 6.3 BHN or over for the mixture.

Further, as a comparison, indium may exhibit a cold flow factor of 0.035 inch per inch in 24 hours at 100 p.s.i., compared to InBi (95:5) alloy with a factor of 0.024 and InBiSb (95:5:5) with a factor of zero, under the same conditions. The said InBiSb alloy endures more than 250 p.s.i. before exhibiting the same cold flow as indium at 100 p.s.i. When 10 percent of 300 mesh aluminum oxide is distributed in the metal materials, the cold flow factor increases so that 500 p.s.i. can be endured. With superfine alumina, 5 percent admixture may give a resistance at 1000 p.s.i. greater than that of indium under 100 p.s.i.; 2½ percent has a like resistance at 900 p.s.i. or above; and 1.0 percent has shown a flow resistance at 800 p.s.i. which is about one-fifth of that of indium under 100 p.s.i. Under bending test, InBi (98:2) showed a stiffness of 0.158 after 10 minutes whereas an InBi mixture with superfine alumina (97:2:1) had a stiffness of 0.288.

The electrochemical behavior at powder ratios of 10 percent and below has been found essentially identical with that of the alloy in the absence of the powder.

As indicated above, regular electrochemical behavior has been exhibited when the bismuth content is 2 percent or over. Smaller percentages exert compensating effects, for example in correcting irregular action of specific lots of commercial indium wherein small amounts of other metals are present as impurities. Thus ½ percent bismuth has been found adequate for regularity in most instances: and even as low as 0.05 percent exhibits a desirable effect.

The amount of the third element or elements in ternary or higher alloys depends upon the increment of physical properties required. In general, for elements of the first to fifth columns of the periodic table such as antimony, lead, zinc, copper, mercury, silver, tin and cadmium, amounts of 1 percent or over are desirable for strengths; with lithium the amounts can be as low as 0.1 percent for a like effect. When inert powders are present for stiffness, these amounts may be lower. The volume and weight required by or introduced by the third element or elements are usually the critical factors as to the maximum permissible: noting that if a stated volume or weight is limiting, then the additives of bismuth, third elements, inert powders, etc., represent losses of available indium for energy production. It is preferred that the selected ternary element be characterized by solid solubility in the indium up to at least 1 percent.

The term "alloys" is used herein as inclusive of bodies formed of two or more metallic elements in intimately mixed and coherent form, and is not limited to the ratio conditions of eutectics or eutectoids. In usual practice, the association is effected by melting the elements together.

The foregoing examples illustrate the behavior of indium-bismuth containing alloys; in mechanical and electrochemical properties; but it is to be understood that employment of the invention is not limited thereto, and that the same can be used in many ways within the scope of the appended claims.

I claim:

1. An electrochemical cell for producing electrical energy and having a cathode, an electrolyte, and an anode, and characterized in having said anode composed of an alloy containing at least 90 percent of indium, at least 0.1 percent bismuth, and the balance lithium.

2. An electrochemical cell for producing electrical energy and having a cathode and an electrolyte, and characterized in having an anode with the active anodic surface thereof presented by a material thereof consisting of an alloy containing at least 90 percent of indium and the balance bismuth.

3. An electrochemical cell for producing electrical energy, and having a cathode and an electrolyte, and characterized in having an anode consisting of an alloy of at least 90 percent indium and with bismuth in amount up to 10 percent, and a supporting member for said anode consisting of an alloy of at least 90 percent of indium, bismuth up to 10 percent and the balance of said latter alloy being selected from the group consisting of antimony, lead, zinc, copper, silver, lithium, mercury, tin, and cadmium.

4. The method of maintaining quick recovery from polarized state of electrochemical cells for producing electrical energy and having anodes containing indium as the major and consumable component, an alkaline electrolyte and a reducible oxide cathode, which comprises employing as anodic material an alloy containing at least 90 percent of indium, 0.05 to 8 percent bismuth, and for any balance an element selected from the group consisting of antimony, lead, zinc, copper, silver, lithium, mercury, tin, and cadmium.

5. An anode for an electrochemical cell for producing electrical energy, said anode having an anodically active surface consisting of an alloy containing at least 90 percent of indium, and 0.05 to 5 percent of bismuth, the content of bismuth being effective in the alloy to reduce polarization effects.

6. An anode as in claim 5, in which in addition to the stated amounts of indium and bismuth, the alloy also contains at least one element selected from the group consisting of antimony, lead, zinc, copper, silver, lithium, mercury, tin, and cadmium, said addition constituting the balance of the alloy.

References Cited in the file of this patent

UNITED STATES PATENTS

| | | |
|---|---|---|
| 2,649,368 | Smith et al. | Aug. 18, 1953 |
| 2,649,369 | Smith et al. | Aug. 18, 1953 |
| 2,680,071 | Epstein et al. | June 1, 1954 |
| 2,683,184 | Boswell | July 6, 1954 |

FOREIGN PATENTS

| | | |
|---|---|---|
| 1,081,155 | France | June 9, 1954 |

OTHER REFERENCES

Jaffe et al., Materials and Methods, September 1952, pp. 113–115.